US012454068B2

(12) United States Patent
Radford et al.

(10) Patent No.: US 12,454,068 B2
(45) Date of Patent: Oct. 28, 2025

(54) SURGICAL CLIPPER BLADE ASSEMBLIES INCLUDING SURGICAL CLIPPER BLADES WITH SKIN PREPARATION COMPOSITION

(71) Applicant: CareFusion 2200, Inc., San Diego, CA (US)

(72) Inventors: Robert Radford, Skokie, IL (US); Sara Tillman, Vernon Hills, IL (US); Camille A. Sendlak, Arlington Heights, IL (US); Isaias Tellez, Kenosha, WI (US)

(73) Assignee: C.R. Bard, Inc.

( * ) Notice: Subject to any disclaimer, the term of this patent is extended or adjusted under 35 U.S.C. 154(b) by 976 days.

(21) Appl. No.: 17/090,264

(22) Filed: Nov. 5, 2020

(65) Prior Publication Data

US 2021/0129361 A1 May 6, 2021

Related U.S. Application Data

(60) Provisional application No. 62/931,490, filed on Nov. 6, 2019.

(51) Int. Cl.

*B26B 19/06* (2006.01)
*B26B 19/04* (2006.01)
*B26B 19/38* (2006.01)
*B26B 19/40* (2006.01)

(52) U.S. Cl.

CPC ............ *B26B 19/06* (2013.01); *B26B 19/046* (2013.01); *B26B 19/382* (2013.01); *B26B 19/40* (2013.01)

(58) Field of Classification Search

CPC ..... B26B 19/06; B26B 19/046; B26B 19/382; B26B 19/40; B26B 21/44; B26B 21/443; B26B 19/38; A45D 27/46

USPC ................. 30/43.91, 43.92, 538; 128/200.17

See application file for complete search history.

(56) References Cited

U.S. PATENT DOCUMENTS 3,252,217 A * 5/1966 Werft .................. B26B 19/3853 30/41
5,473,818 A * 12/1995 Otsuka .................. B26B 19/384 30/43.7
5,830,177 A 11/1998 Li et al.
6,886,255 B2 * 5/2005 Freas ...................... B26B 19/06 30/200
6,993,846 B2 2/2006 Orloff (Continued)

FOREIGN PATENT DOCUMENTS

WO 2001060573 A1 8/2001

*Primary Examiner* — Adam J Eiseman
*Assistant Examiner* — Robert D Cornett
(74) *Attorney, Agent, or Firm* — Dinsmore & Shohl LLP

(57) ABSTRACT

A surgical clipper blade assembly includes a stationary blade and a moveable blade adjacent the stationary blade. The moveable blade is configured to reciprocate relative to the stationary blade to remove hair from a skin area. A blade housing houses the stationary blade and the moveable blade. The blade housing has a guide surface that faces the skin area during a hair removal process. A skin conditioning member in the form of a pad that extends along at least one of a skin facing surface of the stationary blade and the guide surface of the blade housing. The skin conditioning member includes a skin preparation composition. Reciprocating motion of the moveable blade vibrates the skin conditioning member against the skin area as the skin preparation composition is released onto the skin area.

15 Claims, 3 Drawing Sheets

(56) References Cited

U.S. PATENT DOCUMENTS

| | | | | | |
|---|---|---|---|---|---|
| 7,234,239 | B2 * | 6/2007 | Saito | B26B 19/40 | 30/41 |
| 8,191,262 | B2 * | 6/2012 | Palmer | B26B 19/386 | 30/34.05 |
| 2001/0055510 | A1 * | 12/2001 | Furst | B26B 19/40 | 401/196 |
| 2002/0020065 | A1 | 2/2002 | Tseng | | |
| 2005/0050732 | A1 * | 3/2005 | Peter | B26B 19/40 | 30/41 |
| 2005/0050739 | A1 * | 3/2005 | Peter | B26B 19/042 | 30/346.51 |
| 2005/0131427 | A1 * | 6/2005 | Saito | B26B 19/40 | 606/133 |
| 2008/0216324 | A1 * | 9/2008 | Tauer | B26B 19/06 | 30/42 |
| 2009/0178282 | A1 * | 7/2009 | Guay | B26B 19/40 | 30/41.5 |
| 2009/0223057 | A1 * | 9/2009 | Coope-Epstein | B26B 21/443 | 424/70.13 |
| 2011/0203113 | A1 * | 8/2011 | Wang | B26B 21/44 | 30/41 |
| 2012/0102761 | A1 * | 5/2012 | Jessemey | B26B 21/4018 | 30/346.58 |
| 2012/0192428 | A1 * | 8/2012 | McMurray | B26B 19/382 | 30/41 |
| 2013/0205959 | A1 * | 8/2013 | Jones | A61K 8/86 | 30/41 |
| 2014/0310960 | A1 * | 10/2014 | Ariyanayagam | B26B 21/4068 | 76/119 |
| 2014/0360021 | A1 * | 12/2014 | Sonnenberg | C09D 5/00 | 427/236 |
| 2021/0094196 | A1 * | 4/2021 | Schizas | B26B 21/44 | |

* cited by examiner

SURGICAL CLIPPER BLADE ASSEMBLIES INCLUDING SURGICAL CLIPPER BLADES WITH SKIN PREPARATION COMPOSITION

CROSS-REFERENCE

The present application claims the benefit of and priority to U.S. Provisional Application Ser. No. 62/931,490, filed Nov. 6, 2019, titled "Surgical Clipper Blade Assemblies Including Surgical Clipper Blades with Skin Preparation Composition."

TECHNICAL FIELD

The present disclosure generally relates to surgical clippers and methods of use, and more specifically, to surgical clipper blade assemblies including surgical clipper blades with skin preparation compositions and methods of use.

BACKGROUND

Surgical clippers including blade assemblies assist with hair removal from the body of a patient in preparation for surgery or other medical procedure for which a skin area of the patient needs to be cleared of hair. Use of surgical clippers by healthcare personnel for hair removal from the skin area may reduce a risk of cuts and abrasions compared to, for example, use of razor blades. Hair removal from the skin area may cause the skin to experience general irritation due to skin contact with the glade assemblies. Hair removal may also cause the skin to experience microscopic cuts and abrasions that may lead to contamination of a surgical site.

Accordingly, a need exists for surgical clipper blade assemblies and methods of use that deliver a skin preparation composition to a skin site during a hair removal procedure.

SUMMARY

According to one embodiment, a surgical clipper blade assembly includes a stationary blade and a moveable blade adjacent the stationary blade. The moveable blade is configured to reciprocate relative to the stationary blade to remove hair from a skin area. A blade housing houses the stationary blade and the moveable blade. The blade housing has a guide surface that faces the skin area during a hair removal process. A skin conditioning member in the form of a pad that extends along at least one of a skin facing surface of the stationary blade and the guide surface of the blade housing. The skin conditioning member includes a skin preparation composition. Reciprocating motion of the moveable blade vibrates the skin conditioning member against the skin area as the skin preparation composition is released onto the skin area.

According to another embodiment, a surgical hair clipper includes a clipper body that provides a housing for a motor. A blade assembly that is operatively connected to the clipper body, the blade assembly includes a stationary blade and a moveable blade adjacent the stationary blade. The moveable blade is configured to reciprocate relative to the stationary blade to remove hair from a skin area. A blade housing houses the stationary blade and the moveable blade. The blade housing has a guide surface that faces the skin area during a hair removal process. A skin conditioning member in the form of a pad that extends along at least one of a skin facing surface of the stationary blade and the guide surface of the blade housing. The skin conditioning member includes a skin preparation composition Reciprocating motion of the moveable blade vibrates the skin conditioning member against the skin area as the skin preparation composition is released onto the skin area.

According to another embodiment, a method of using a surgical hair clipper for hair removal from a skin area of a patient is provided. The method includes coupling the blade assembly to a clipper body of a surgical hair clipper. The blade assembly includes a stationary blade and a moveable blade adjacent the stationary blade. The moveable blade configured to reciprocate relative to the stationary blade to remove hair from a skin area. A blade housing houses the stationary blade and the moveable blade. The blade housing has a guide surface that faces the skin area during a hair removal process. A skin conditioning member in the form of a pad that extends along at least one of a skin facing surface of the stationary blade and the guide surface of the blade housing. The skin conditioning member includes a skin preparation composition. Reciprocating motion of the moveable blade vibrates the skin conditioning member against the skin area as the skin preparation composition is released onto the skin area. The moveable blade is operated through the clipper body while the skin preparation composition is delivered to the skin area.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Surgical clippers introduce friction with a skin area including hair for removal during use. Friction refers to a resistance that one surface or object encounters when moving over and with respect to another surface or object. Such surgical clipper friction may be caused by surface area contact with the skin area by a blade assembly of the surgical clipper. The friction may vary depending on whether the skin area is dry or has been wetted with a skin preparation composition. In embodiments, such a skin preparation composition may include water, an antiseptic solution, and/or surfactant. With respect to the surgical clipper blade assemblies described herein, one or more skin contact areas of a blade of the surgical clipper blade assemblies may include a skin preparation composition. The skin preparation composition generally contains a chemical compound that is used to improve the skin, whether it be a skin surface or the skin itself. As used herein, "skin preparation composition" refers to a composition that is suitable for application to skin that provides a positive effect to or on the skin, such as reducing friction during use of the surgical clipper for hair removal from the skin area and/or reducing bacterial load on the skin using an antiseptic molecule. In some embodiments, the skin preparation composition may include lipids or other skin conditioning compounds that reinforce or otherwise improve the status of the skin.

Figure 1:
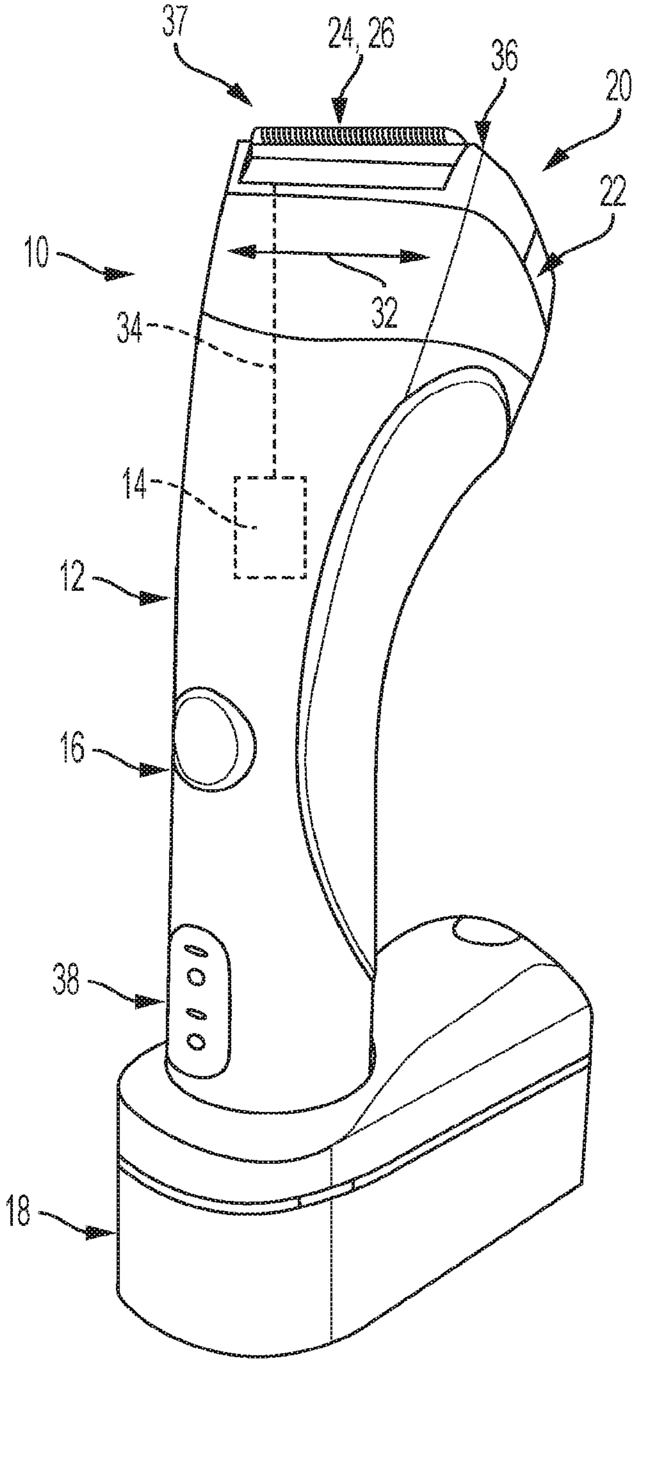
FIG. 1 illustrates a diagrammatic perspective view of a surgical hair clipper, according to one or more embodiments shown and described herein.

Referring to FIG. 1, a surgical hair clipper 10 includes a clipper body 12 that provides a housing for components of the surgical hair clipper, such as a motor (e.g., a rotary motor), which is illustrated schematically by element 14, and a user interface 16 that is used to control operation of the surgical hair clipper 10. The clipper body 12 may further include a rechargeable battery (e.g., a lithium battery) that can be recharged using a charging station 18.

A blade assembly 20 is connected to the clipper body 12. The blade assembly 20 includes a blade housing 22 and a moveable blade 26 that extends outwardly from the blade housing 22. In some embodiments, the blade assembly 20 may be removable from the clipper body 12 and be disposable. In other embodiments, the blade assembly 20 may be a permanent part of the clipper body 12 and may not be intended to be removable without damage to the surgical hair clipper 10. For removable blade assemblies 20, there may different blade assembly types, such as general purpose blade assembly for body hair, a neuro blade assembly for scalp and other thick, course hair and a sensitive blade assembly for perineal/sensitive areas. The blade assemblies may be intended for a single use.

Figure 2:
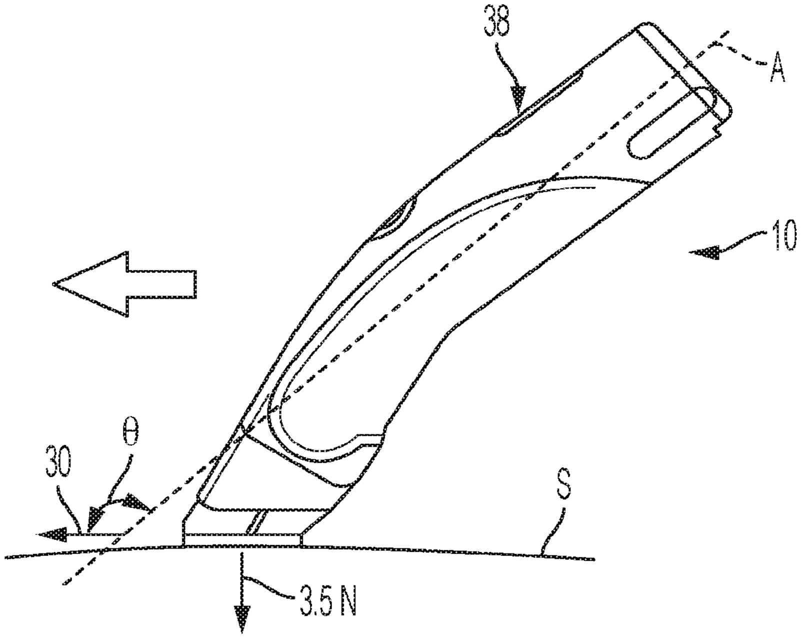
FIG. 2 illustrates a diagrammatic side view of the surgical hair clipper of FIG. 1 in use, according to one or more embodiments shown and described herein.

The blade assembly 20 includes the moveable blade 26 and a stationary blade 24 that both extend outwardly from a corner 28 of the blade housing 22 defining a blade cutting direction in the direction of arrow 30 (FIG. 2). The blades 24 and 26 have teeth that provide a comb-like shape across a width of the blades 24 and 26 defining a width direction in the direction of arrow 32 that is perpendicular to the blade cutting direction. The motor 14 reciprocates the moveable blade 26 in the width direction relative to the stationary blade 24 via a linkage 34 in order to cut hair located between the teeth.

The blade housing 22 includes a guide surface 36 that is located at a skin engagement end 37 of the surgical hair clipper 10. The guide surface 36 faces the skin during a trimming operation. As can be seen, the guide surface 36 defines a plane that is substantially parallel with the cutting direction 30. In some embodiments, the cutting direction 30 and the guide surface 36 may be at an angle θ (e.g., between about 135 and about 145 degrees) that is oblique to a central axis A that passes through a base portion 38 of the blade housing 22 (FIG. 2).

Figure 3:
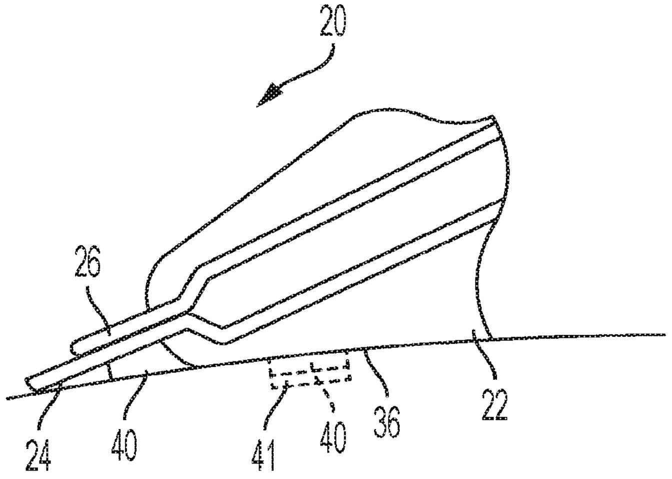
FIG. 3 is a diagrammatic section view of a blade assembly of the surgical hair clipper of FIG. 1, according to one or more embodiments shown and described herein.

Referring to FIG. 3, a diagrammatic section view of the blade assembly 20 is illustrated. As indicated above, in some embodiments, the blade assembly is removable from the clipper body 12 and is disposable. In some embodiments, the blade assembly 20 may be intended for a single use. The blade assembly 20 includes the blade housing 22 and the blades 24 and 26. In the illustrated example, the stationary blade 24 is closest to the guide surface 36 and extends outwardly from a leading side of the blade housing 22. In other embodiments, the moveable blade 26 may be closest to the guide surface 36. Located on the stationary blade 24 is a skin conditioning member 40 that is in the form of a pad (e.g., formed of foam, gel, etc.) that includes a skin preparation composition. The skin conditioning member 40 may include a single pad (e.g., in the form of an elongated strip, or multiple pads. While the skin conditioning member is illustrated on the blade 24, it may be located on the guide surface 36, as represented by the dotted lines. A cover film 41, such as a plastic or foil may be placed over the skin conditioning member 40 that can be removed by the user to expose the skin preparation composition.

The skin conditioning member 40 may include a matrix of insoluble polymer, an effective amount of water-soluble polymer dispersed in the matrix, and a compatibilizer material that improves the compatibility of the water-soluble polymer with the water-insoluble polymer to enhance release of the water-soluble polymer during use. The skin conditioning member 40 further includes the skin preparation composition. The skin preparation composition may include, for example, low molecular weight water-soluble release enhancing agents (e.g., polyethylene glycol), water-swellable release enhancing agents (e.g., cross-linked polyacrylics), colorants, antioxidants, preservatives, vitamins, aloe, cooling agents, essential oils, astringents, lipids and/or medicinal agents. In some embodiments, the skin preparation composition may be selected to augment a surgical prep procedure by utilizing compounds that work orthogonally to the active ingredients in many pre-surgical preps (e.g., alcohol, chlorhexidine gluconate (CHG), povidone-iodine (PVP-I) that can cause the hair to become sticky and more difficult to remove. The skin conditioning member 40 may include a colorant in order to change color after usage.

The skin conditioning member 40 may be located on the stationary blade 24 and adjacent the guide surface 36. During use, the skin conditioning member 40 is sandwiched between the stationary blade 24 and the skin and releases the skin preparation composition as the guide surface 36 is moved along the skin. In some embodiments, the skin conditioning member 40 is vibrated due to the reciprocating side-to-side movement of the moveable blade 26. The mechanical vibration can assist in penetration of the skin preparation composition into the skin. For example, chlorhexidine may not penetrate significantly below approximately 100 μm below the skin surface. However, potential pathogens, such as *P. acnes*, reside in the sebaceous glands, which can reside approximately 300 μm below the skin surface. Vibration can aid in the penetration of the skin preparation composition by providing an exogenous source that overcomes the otherwise slow rate of diffusion of topical compounds. Examples of molecules that could be useful to inactivate *P. acnes* are, for example, benzyl peroxide, lauric acid and clindamycin.

A method of using the surgical hair clipper 10 for hair removal from a skin surface of a patient may include coupling the blade assembly 20 to the clipper body 12. The blade assembly 20 includes, as described herein, the blades 24 and 26 and blade housing 22 having an aperture through which the blades 24 and 26 extend. The skin conditioning member 40 is located on the stationary blade 24 and adjacent the guide surface 36. The method includes facing the guide surface 36 of the blade assembly 20 toward the skin area, and operating the blades 24, 26 through the clipper body 112 to remove hair from the skin area of the patient. As the blade assembly 20 is moved along the skin, the skin conditioning member 40 releases the skin preparation composition to the skin. Vibration of the blades 24, 26 and the skin conditioning member 40 can facilitate penetration of the skin preparation composition into layers of the skin.

As described herein, the clipper body 12 of the surgical hair clipper 10 is configured to electronically operate the blades 24, 26. The clipper body 12 includes the enclosure housing an electrical motor and a battery, which battery is configured to be rechargeable through coupling of the clipper body 12 to the charging station 18 (FIG. 1). The clipper body 12 of the surgical hair clipper 10 further may include a charge indicator configured to indicate a low battery level of the battery below a predefined threshold. The method may include triggering an alarm through the charge indicator of the low battery level, coupling the body to the charging adaptor, and recharging the battery. The alarm may be a visual, audio, or tactile alarm. Such a visual alarm may be an LED light that may, for example, red to indicate the low battery level.

Figure 4:
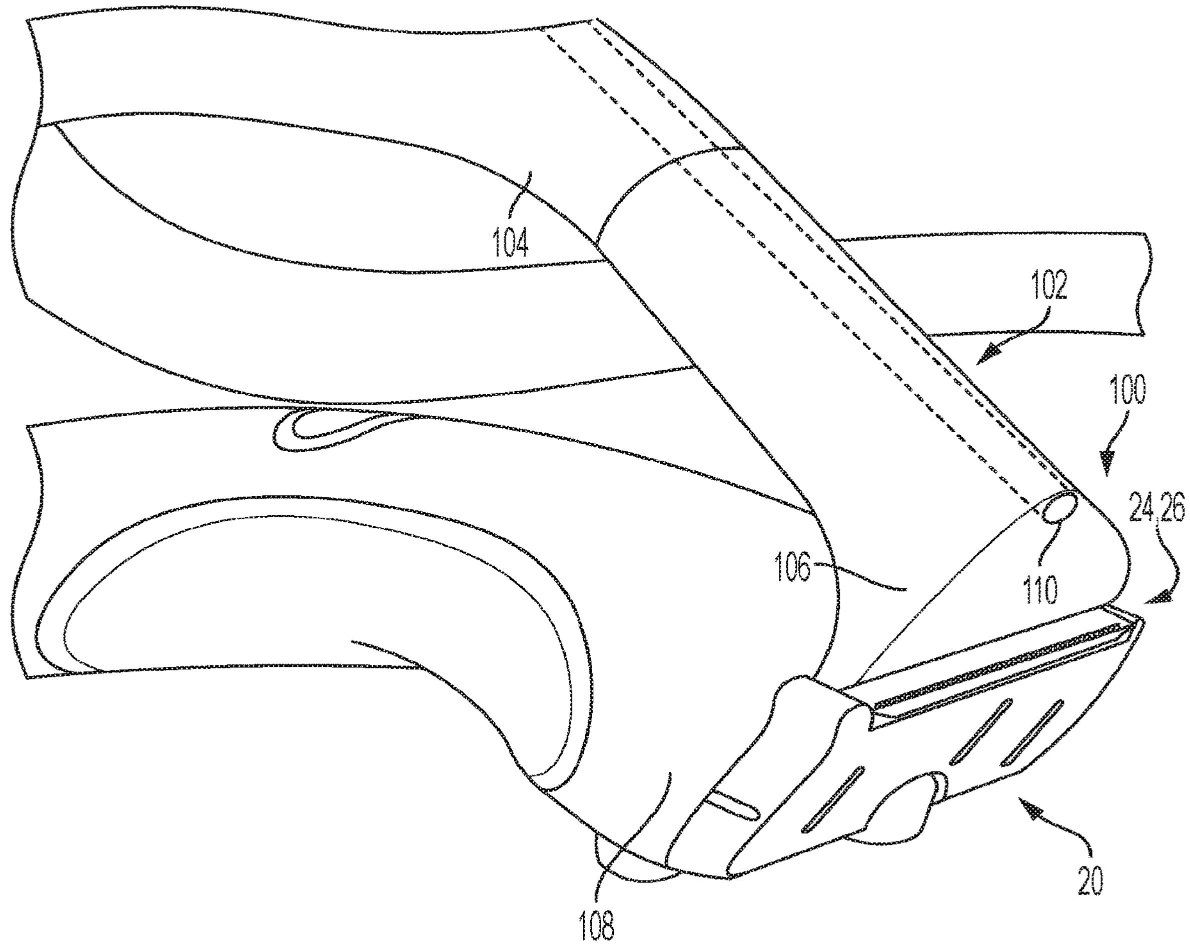
FIG. 4 is a diagrammatic section view of a surgical hair clipper used along with a vacuum apparatus, according to one or more embodiments shown and described herein.

Referring to FIG. 4, in another embodiment, a skin conditioning member 100 may be provided at a location other than the blades of the surgical hair clipper. In this example, a vacuum apparatus 102 comprises a hose 104 and a nozzle 106 that is located at a distal end of the hose 104 and is in fluid communication therewith. The nozzle 106 is attached to the surgical hair clipper 10 at a location forward of the blades 24, 26 using a clip 108. The skin conditioning member 100 may comprise an applicator 110 that is used to apply a skin conditioning compound to the skin at a location adjacent the nozzle 106. In some embodiments, the applicator 110 may be connected to a pump to apply a metered dose of the skin preparation composition as the surgical hair clipper 10 is moved along the skin. Vibration of the blades 24, 26 can facilitate penetration of the skin conditioning compound into the skin, as discussed above. In some embodiments, the skin conditioning member may include an applicator that is separate from the surgical hair clipper 10 and the vacuum apparatus and comprise a pump that can be manually activated to meter a skin conditioning compound onto the skin surface before (e.g., less than 30 seconds) the hair removal process.

The above-described surgical hair clippers utilize vibration associated with reciprocating motion of the moveable blades to help drive skin condition composition deeper into the strateum corneum or hair follicle. The compounds chosen (e.g., antiseptics, lipids, etc.) would be functional in their own right but the mechanical vibration can help overcome an inherent inability to penetrate deeper layers of skin. The skin preparation compositions may be applied using a skin conditioning member in the form of a pad that can be located on a skin facing surface of the stationary blade so that the skin conditioning member contacts the skin during a hair removal operation. While placing the skin conditioning member on the stationary blade is discussed primarily above, the skin conditioning member may also be located on the guide surface of the blade housing. FIG. 3 illustrates an alternative embodiment with a skin conditioning member 40 located on the guide surface 36. In some embodiments, the skin conditioning member may be recessed into the guide surface. More than one skin conditioning member may be used. For example, there may be multiple pads containing the skin preparation composition or different skin preparation compositions on both the stationary blade and the guide surface of the blade housing.

Clause 1. In one embodiment, a surgical clipper blade assembly comprising: a stationary blade; a moveable blade adjacent the stationary blade, the moveable blade configured to reciprocate relative to the stationary blade to remove hair from a skin area; a blade housing that houses the stationary blade and the moveable blade, the blade housing having a guide surface that faces the skin area during a hair removal process; and a skin conditioning member in the form of a pad that extends along at least one of a skin facing surface of the stationary blade and the guide surface of the blade housing, the skin conditioning member comprising a skin preparation composition; wherein reciprocating motion of the moveable blade vibrates the skin conditioning member against the skin area as the skin preparation composition is released onto the skin area.

Clause 2. The surgical clipper blade assembly of clause 1, wherein the skin preparation composition comprises one or more of antiseptics, lipids, benzyl peroxide, lauric acid and clindamycin.

Clause 3. The surgical clipper blade assembly of clause 1 or 2, wherein the skin conditioning member is located on the skin facing surface of the stationary blade and is adjacent the guide surface.

Clause 4. The surgical clipper blade assembly of any one of clauses 1-3 further comprising more than one skin conditioning member.

Clause 5. The surgical clipper blade assembly of clause 4, wherein the skin conditioning members comprise different skin preparation compositions.

Clause 6. The surgical clipper blade assembly of clause 4 or 5, wherein one of the more than one skin conditioning member is located on the guide surface.

Clause 7. The surgical clipper blade assembly of any one of clause 1 or 2, wherein the skin conditioning member is located on the guide surface of the blade housing.

Clause 8. The surgical clipper blade assembly of any one of clauses 1-7, wherein each of the movable blade and the stationary blade comprise teeth that provide a comb-like shape across a width of the movable and stationary blades.

Clause 9. In another embodiment, a surgical hair clipper comprising: a clipper body that provides a housing for a motor; a blade assembly that is operatively connected to the clipper body, the blade assembly comprising: a stationary blade; a moveable blade adjacent the stationary blade, the moveable blade configured to reciprocate relative to the stationary blade to remove hair from a skin area; a blade housing that houses the stationary blade and the moveable blade, the blade housing having a guide surface that faces the skin area during a hair removal process; and a skin conditioning member in the form of a pad that extends along at least one of a skin facing surface of the stationary blade and the guide surface of the blade housing, the skin conditioning member comprising a skin preparation composition; wherein reciprocating motion of the moveable blade vibrates the skin conditioning member against the skin area as the skin preparation composition is released onto the skin area.

Clause 10. The surgical hair clipper of clause 9, wherein the skin preparation composition comprises one or more of antiseptics, lipids, benzyl peroxide, lauric acid and clindamycin.

Clause 11. The surgical hair clipper of clause 9 or 10, wherein the skin conditioning member is located on the skin facing surface of the stationary blade and is adjacent the guide surface.

Clause 12. The surgical hair clipper of any one of clauses 9-11 further comprising more than one skin conditioning member.

Clause 13. The surgical hair clipper of clause 12, wherein the skin conditioning members comprise different skin preparation compositions.

Clause 14. The surgical hair clipper of clause 11 or 12, wherein one of the more than one skin conditioning member is located on the guide surface.

Clause 15. The surgical hair clipper of any one of clause 9 or 10, wherein the skin conditioning member is located on the guide surface of the blade housing.

Clause 16. The surgical hair clipper of any of clauses 9-15, wherein each of the movable blade and the stationary blade comprise teeth that provide a comb-like shape across a width of the movable and stationary blades.

Clause 17. In another embodiment, a method of using a surgical hair clipper for hair removal from a skin area of a patient, the method comprising: coupling the blade assembly to a clipper body of a surgical hair clipper, the blade assembly comprising: a stationary blade; a moveable blade adjacent the stationary blade, the moveable blade configured to reciprocate relative to the stationary blade to remove hair from a skin area; a blade housing that houses the stationary blade and the moveable blade, the blade housing having a guide surface that faces the skin area during a hair removal process; and a skin conditioning member in the form of a pad that extends along at least one of a skin facing surface of the stationary blade and the guide surface of the blade housing, the skin conditioning member comprising a skin preparation composition; wherein reciprocating motion of the moveable blade vibrates the skin conditioning member against the skin area as the skin preparation composition is released onto the skin area; operating the moveable blade through the clipper body while the skin preparation composition is delivered to the skin area.

Clause 18. The method of clause 17 comprising vibrating the skin area using reciprocal motion of the moveable blade with the skin preparation composition delivered to the skin area.

Clause 19. The method of clause 17 or 18, wherein the skin preparation composition comprises one or more of antiseptics, lipids, benzyl peroxide, lauric acid and clindamycin.

Clause 20. The method of any one of clauses 17-19, wherein the skin conditioning member is located on the guide surface of the blade housing.

For the purposes of describing and defining the present disclosure, it is noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present disclosure it is noted that the terms "substantially" and "approximately" and "about" are utilized herein to represent the inherent degree of uncertainty that may be attributed to any quantitative comparison, value, measurement, or other representation. The terms "substantially" and "approximately" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A surgical clipper blade assembly comprising:
- a stationary blade;
- a moveable blade adjacent the stationary blade, the moveable blade configured to reciprocate relative to the stationary blade to remove hair from a skin area;
- a blade housing that houses the stationary blade and the moveable blade, the blade housing having a guide surface that faces the skin area during a hair removal process; and
- a skin conditioning member in the form of a pad that extends along a skin facing surface of the stationary blade, the skin conditioning member comprising a material formed of a matrix of insoluble polymer and a skin preparation composition dispersed in the matrix;
- wherein the moveable blade is configured such that reciprocating motion of the moveable blade vibrates the skin conditioning member against the skin area as the skin preparation composition is released onto the skin area;
- wherein the skin conditioning member is carried on a side of the stationary blade that is opposite the moveable blade on a leading edge of the blade housing adjacent the guide surface and the material formed of the matrix of insoluble polymer is arranged and configured to be sandwiched between the stationary blade and the skin area with the guide surface in contact with the skin area during the hair removal process;
- wherein the material formed of the matrix of insoluble polymer abuts both the stationary blade and the guide surface, the blade housing defining the guide surface.

2. The surgical clipper blade assembly of claim 1, wherein the skin preparation composition comprises one or more of antiseptics, lipids, benzyl peroxide, lauric acid and clindamycin.

3. The surgical clipper blade assembly of claim 1 further comprising more than one skin conditioning member.

4. The surgical clipper blade assembly of claim 3, wherein the skin conditioning members comprise different skin preparation compositions.

5. The surgical clipper blade assembly of claim 3, wherein one of the more than one skin conditioning member is located on the guide surface.

6. The surgical clipper blade assembly of claim 1, wherein each of the movable blade and the stationary blade comprise teeth that provide a comb shape across a width of the movable and stationary blades.

7. A surgical hair clipper comprising:
- a clipper body that provides a housing for a motor;
- a blade assembly that is operatively connected to the clipper body, the blade assembly comprising:
- a stationary blade;

a moveable blade adjacent the stationary blade, the moveable blade configured to reciprocate relative to the stationary blade to remove hair from a skin area;

a blade housing that houses the stationary blade and the moveable blade, the blade housing having a guide surface that faces the skin area during a hair removal process; and a skin conditioning member in the form of a pad that extends along a skin facing surface of the stationary blade and the guide surface of the blade housing, the skin conditioning member comprising a material formed of a matrix of insoluble polymer and a skin preparation composition dispersed in the matrix;

wherein the moveable blade is configured such that reciprocating motion of the moveable blade vibrates the skin conditioning member against the skin area as the skin preparation composition is released onto the skin area;

wherein the skin conditioning member is carried on a side of the stationary blade that is opposite the moveable blade on a leading edge of the blade housing adjacent the guide surface and the material formed of the matrix of insoluble polymer is arranged and configured to be sandwiched between the stationary blade and the skin area with the guide surface in contact with the skin area during the hair removal process;

wherein the material formed of the matrix of insoluble polymer abuts both the stationary blade and the guide surface, the blade housing defining the guide surface.

8. The surgical hair clipper of claim 7, wherein the skin preparation composition comprises one or more of antiseptics, lipids, benzyl peroxide, lauric acid and clindamycin.

9. The surgical hair clipper of claim 7 further comprising more than one skin conditioning member.

10. The surgical hair clipper of claim 9, wherein the skin conditioning members comprise different skin preparation compositions.

11. The surgical hair clipper of claim 9, wherein one of the more than one skin conditioning member is located on the guide surface.

12. The surgical hair clipper of claim 7, wherein each of the movable blade and the stationary blade comprise teeth that provide a comb shape across a width of the movable and stationary blades.

13. A method of using a surgical hair clipper for hair removal from a skin area of a patient, the method comprising:

coupling a blade assembly to a clipper body of a surgical hair clipper, the blade assembly comprising:

a stationary blade;

a moveable blade adjacent the stationary blade, the moveable blade configured to reciprocate relative to the stationary blade to remove hair from a skin area;

a blade housing that houses the stationary blade and the moveable blade, the blade housing having a guide surface that faces the skin area during a hair removal process; and a skin conditioning member in the form of a pad that extends along a skin facing surface of the stationary blade, the skin conditioning member comprising a material formed of a matrix of insoluble polymer and a skin preparation composition, the material formed of the matrix of insoluble polymer abutting both the stationary blade and the guide surface, the blade housing defining the guide surface;

wherein reciprocating motion of the moveable blade vibrates the skin conditioning member against the skin area as the skin preparation composition is released onto the skin area;

operating the moveable blade through the clipper body while the skin preparation composition is delivered to the skin area, the skin conditioning member is carried on a side of the stationary blade that is opposite the moveable blade on a leading edge of the blade housing adjacent the guide surface and the material formed of the matrix of insoluble polymer is arranged and configured to be sandwiched between the stationary blade and the skin area with the guide surface in contact with the skin area during the hair removal process.

14. The method of claim 13 comprising vibrating the skin area using reciprocal motion of the moveable blade with the skin preparation composition delivered to the skin area.

15. The method of claim 13, wherein the skin preparation composition comprises one or more of antiseptics, lipids, benzyl peroxide, lauric acid and clindamycin.

* * * * *